United States Patent
Bordui et al.

(10) Patent No.: US 7,433,348 B1
(45) Date of Patent: Oct. 7, 2008

(54) TIME DIVISION MULTIPLEXING PROTOCOL FOR WIRELESS NETWORKS

(75) Inventors: David Bordui, Heathrow, FL (US);
Johnny Brown, San Diego, CA (US);
David Wright, San Diego, CA (US);
Robert B. Swan, III, Pelham, NH (US);
Mark Schultz, Ewing, NJ (US)

(73) Assignee: Cypress Semiconductor Corp., San Jose, CA (US)

( * ) Notice: Subject to any disclaimer, the term of this patent is extended or adjusted under 35 U.S.C. 154(b) by 80 days.

(21) Appl. No.: 11/245,272

(22) Filed: Oct. 5, 2005

Related U.S. Application Data

(60) Provisional application No. 60/621,243, filed on Oct. 22, 2004.

(51) Int. Cl.
*H04Q 7/20* (2006.01)

(52) U.S. Cl. ............... 370/350; 370/345; 370/343; 370/503; 370/509; 455/500; 455/502; 455/501; 455/422.1; 455/403

(58) Field of Classification Search ............... 370/350, 370/345, 343, 312, 313, 314, 328, 329, 338, 370/347, 480, 503, 509, 510, 512; 455/426.1, 455/426.2, 422, 502, 500, 517, 466, 414.1, 455/501, 458, 445, 422.1, 403
See application file for complete search history.

(56) References Cited

U.S. PATENT DOCUMENTS

| | | | | |
|---|---|---|---|---|
| 4,031,330 | A * | 6/1977 | van Leeuwen | 375/240 |
| 5,517,505 | A * | 5/1996 | Buchholz et al. | 370/350 |
| 6,097,707 | A * | 8/2000 | Hodzic et al. | 370/321 |
| 6,181,947 | B1 * | 1/2001 | Du et al. | 455/509 |
| 6,208,247 | B1 * | 3/2001 | Agre et al. | 340/539.19 |
| 6,366,566 | B1 | 4/2002 | Scott | |
| 6,587,444 | B1 | 7/2003 | Lenzo et al. | |
| 6,757,261 | B1 | 6/2004 | Olgaard et al. | |
| 6,781,985 | B1 | 8/2004 | Feder et al. | |
| 6,788,924 | B1 * | 9/2004 | Knutson et al. | 455/265 |
| 6,973,067 | B1 * | 12/2005 | Haartsen | 370/337 |

\* cited by examiner

*Primary Examiner*—Keith T Ferguson
(74) *Attorney, Agent, or Firm*—Blakely, Sokoloff, Taylor & Zafman LLP

(57) ABSTRACT

A multi-node time division multiplexing (TDM) system is disclosed. The improved method and apparatus utilizes an asynchronous synchronization packet (ASP) to synchronize the timing in all the nodes of the system. In some embodiments, the ASP also maps the time slots in a data frame to particular nodes. The ASP is sent at the start of each data frame to all the nodes in the system and each node synchronizes itself to the time of receipt of the ASP, thus establishing frame-based timing for all the nodes. Additionally, the ASP can contain a table that maps the data frame time slots to the nodes in the system.

16 Claims, 3 Drawing Sheets

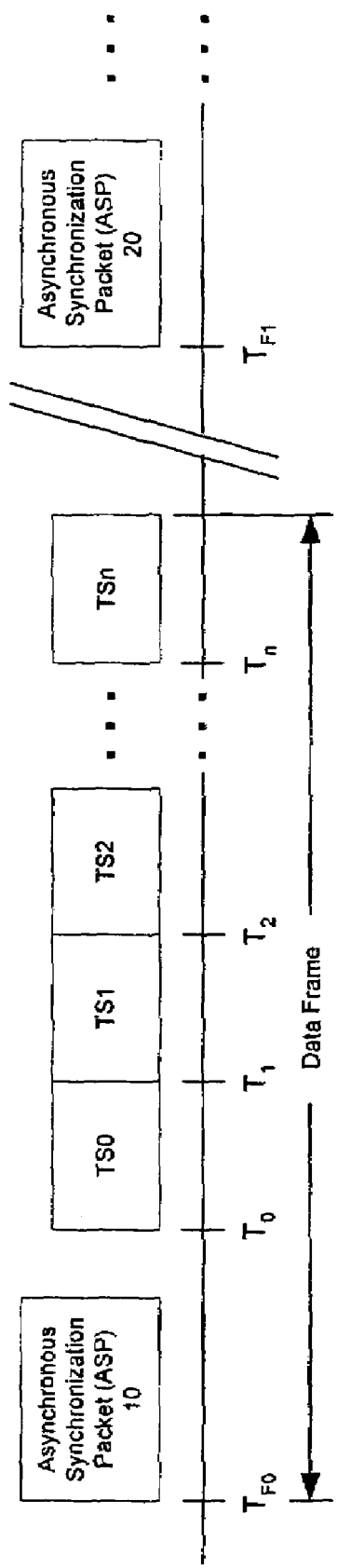

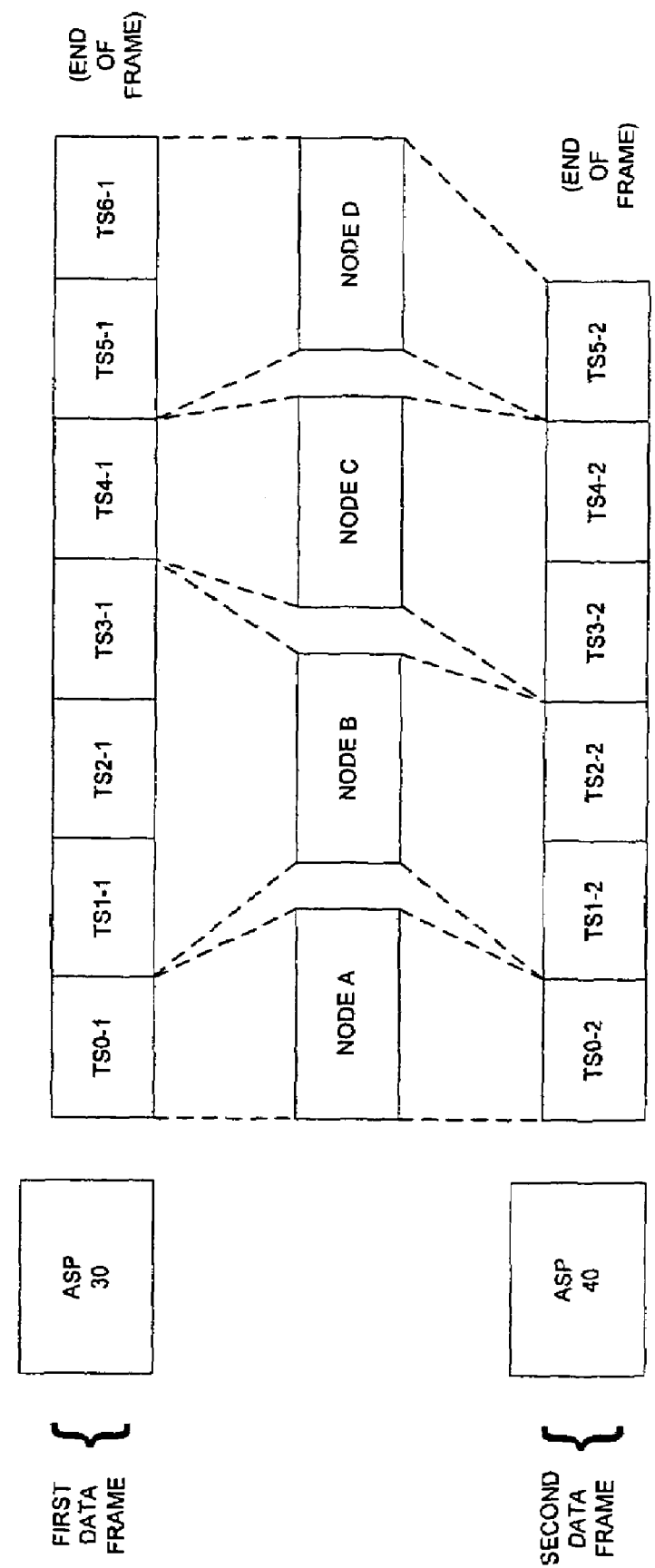

TIME DIVISION MULTIPLEXING PROTOCOL FOR WIRELESS NETWORKS

RELATED APPLICATION

This application is a non-provisional application of provisional application Ser. No. 60/621,243 filed Oct. 22, 2004. Priority of application 60/621,243 is hereby claimed. The entire contents of application 60/621,243 are hereby incorporated by reference.

FIELD OF THE INVENTION

The present invention relates generally to electronic circuits, and in particular to circuits for wireless networking.

BACKGROUND OF THE INVENTION

Multi-node communication systems generally need an operating protocol to enable the nodes to communicate with each other. Two commonly used protocols are frequency domain multiplexing (FDM) and time division multiplexing (TDM).

The FDM protocol utilizes a different frequency "channel" for each node. In a TDM system the nodes take turns using a communication channel. The TDM protocol divides a communications channel into frames and it allocates each node one or more individual time slots in each frame. In general a system using a TDM protocol can scale to handle as many nodes as needed by merely adding additional time slots in each frame. The time clocks in all the nodes in a TDM system must be synchronized to a common time base so that each node knows when its respective time slot begins. Several conventional methods exist for synchronization of clocks in a TDM system. These include techniques such as: (a) a base station sends out a signal to one node at a time to indicate the beginning of that node's time slot, (b) clock signals embedded in the data packets to establish a common time base, (c) a phase locked loop (PLL) in each node that is synchronized to a 'heartbeat' signal, etc. The conventional methods in general require significant hardware and timing overhead in order to operate.

SUMMARY OF THE INVENTION

The present invention provides an improved technique for synchronization in a multi-node TDM system. The present invention utilizes asynchronous synchronization packets (ASPs) to initiate each data frame. The ASP is generated by a base station at the start of a data frame and it is simultaneously transmitted to all the nodes in the system. When an ASP is received by a node, the time of receipt is used as a timing marker to synchronize the clock in the node to the clock in the base station.

In some embodiments, the ASP contains information that maps each node to particular time slots within the data frame. Furthermore, in some embodiments, the ASP is used to establish the node mapping on a frame-by-frame basis.

BRIEF DESCRIPTION OF DRAWINGS

FIG. 2 illustrates data frame timing.
FIG. 3 shows an example of frame-to-frame mapping.

DETAILED DESCRIPTION

Figure 1:
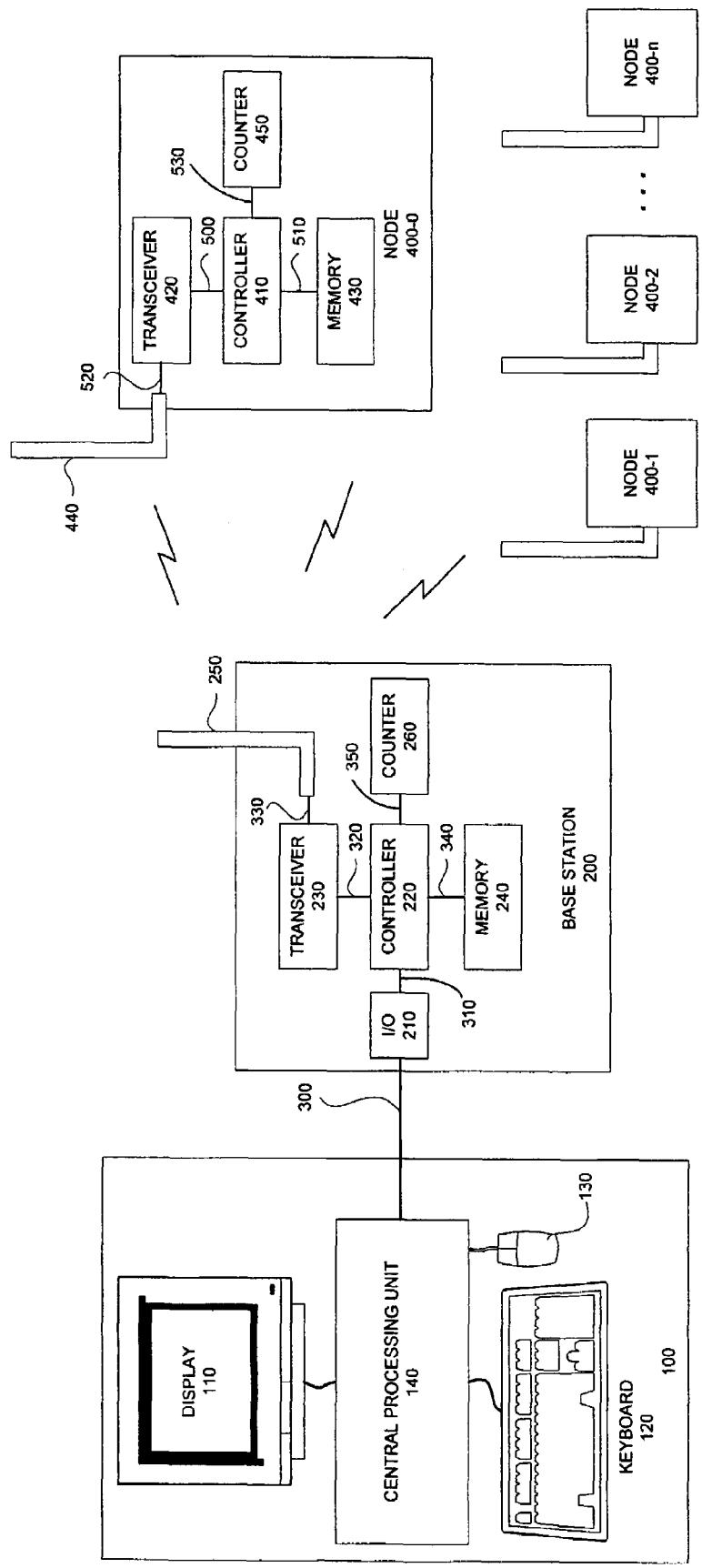
FIG. 1 illustrates a preferred embodiment of the invention.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

A preferred embodiment of the invention is illustrated in FIG. 1. In the preferred embodiment a computer 100 is connected to multiple nodes (designated 400-0, 400-1, 400-2 and 400-*n*) by a wireless base station 200. The computer 100 includes a display 110, keyboard 120, mouse 130, and central processing unit (CPU) 140. The display 110, keyboard 120, mouse 130, and central processing unit (CPU) 140 are conventional and they perform the functions of a typical computer system.

The base station 200 comprises an I/O interface 210, controller 220, transceiver 230, memory 240, antenna 250, and counter 260. I/O interface 210 communicates with the computer 100 via a conventional hardwired or wireless computer interface.

Controller 220 controls the basic operations of the base station and the flow of information to and from the remote nodes. Transceiver 230 modulates data for wireless transmission to the remote nodes using antenna 250 and demodulates wireless data received from the remote nodes on antenna 250. Memory 240 stores the data needed for the operation of the base station 200. Counter 260 keeps track of time.

In the specific embodiment shown in FIG. 1, base station 200 wirelessly communicates with multiple identical nodes. Since the nodes are identical, only Node 400-0 will be described in detail. Node 400-0 includes a controller 410, a transceiver 420, a memory 430, an antenna 440, and a counter 450. Controller 410 controls the basic operations of the node and the flow of information to and from the base station and/or the other nodes. Transceiver 420 modulates data for wireless transmission to the base station and/or other nodes using antenna 440, and demodulates wireless data received from the base station and/or other nodes on antenna 440. Memory 430 stores the data needed for the operation of the node. Counter 450 keeps track of time.

FIG. 2 illustrates one frame of data on the communication channel between the base station 200 and the nodes 400-0, 400-1 etc. As illustrated in FIG. 2, at the beginning of a frame, an ASP is transmitted. In FIG. 2 this is illustrated by ASP 10.

The timing for the rest of the data frame is based on the time that the ASP is sent. Thus, in a system with n time slots, all the time slot start times, $T_0$, $T_1$, $T_2$, up to $T_n$ are derived from $T_{F0}$. Each node can calculate $T_0$, $T_1$, $T_2$, up to $T_n$ by using an internal counter that is reset each time an ASP is received. Thus all nodes are synchronized relative to $T_{F0}$. FIG. 2 shows the individual time slots TS0, TS1, TS2, up to TSn, each starting at respective times $T_0$, $T_1$, $T_2$, up to $T_n$.

Some nodes may be given more than one time slot, if they are expected to transmit more information than other devices. For example time slot TS0 may be mapped to node A and time slots TS1 and TS2 may be mapped to node B. In some embodiments, some time slots are not mapped to a node (thus, they are not used) and some nodes may not have any time slots mapped to them.

Each data frame ends when the last time slot period TSn has passed. The next data frame starts with ASP 20 at time $T_{F1}$. As in the previous data frame, the sending of ASP 20 initiates a new timing sequence and time slot allocation. After a data frame ends, the base station 200 can send an ASP at any time to initiate a new data frame. The ASPs that initiate new frames can be sent at fixed intervals. However, there is no requirement that the ASPs that initiate new data frames be sent at fixed timing intervals, and various algorithms that take into account various system conditions can be used to determine when ASPs are sent to initiate new data frames.

FIG. 3 shows an example of how time slots may be mapped to nodes in two ASPs designated 30 and 40. The time slots mapped by ASP 30 are designated by the time slot designation followed by the numeral 1 and the time slots mapped by ASP 40 have a 2 following the time slot designation. For example time slot TS0 mapped by ASP 30 is designated TS0-1 and time slot TS0 mapped by ASP 40 is designated TS0-2.

In the example shown in FIG. 3, both ASPs map time slot TS0 to node A. However, ASP 30 maps three time slots TS1, TS2 and TS3 to node B while ASP 40 maps only time slots TS1 and TS2 to node B.

In a simple embodiment, the mapping of time slots to nodes would be established at system set-up time and the assignment would be stored in the computer and in each node. In such an embodiment, the assignment of nodes to time slots remains fixed and the ASP is only used to set the clock or counter in the nodes.

However, in some embodiments, the assignment of nodes to time slots can be controlled by information stored in the ASP. In such embodiments, ASP contains information that maps particular time slots to particular nodes. The nodes read the information stored in the ASP and use the mapping information in the ASP to determine their respective time slots (i.e. the slots during which they can send or receive information). In such embodiments, the mapping combined with the timing information derived from $T_{F0}$ tells each node exactly when it is allowed to communicate.

An algorithm for mapping time slots to nodes is established at system set up time. It can be a simple algorithm such as an algorithm that assigns one time slot to each detected device. Or it can be somewhat more complicated such as an algorithm that assigns one time slot to every detected device except for devices of type X and that assigns two time slots to each device of type X. The assignment can be fixed at setup time and require no node assignment information to be contained in the ASP. Alternatively, the assignment information can be contained in each ASP (or in selected ASPs) and it can be changed from time to time as new nodes are added to the system or as the load balance changes. In some embodiments, the algorithm for assigning time slots is still more complicated and it takes into account a wide range of system information.

The operation of the preferred embodiment shown in FIG. 1 will now be discussed in greater detail. The first step is for the base station to identify all the nodes in the system. There are many conventional ways of doing this such as polling all the addresses individually and seeing which ones respond as a valid node. Additionally, information relating to the communication needs of each node may be collected as well. After the data is gathered it is stored in memory 240.

The next step is for controller 220 to generate the ASP. Each active node will be assigned a time slot or multiple time slots in the ASP based on the information previously collected and stored in memory 240. Controller 220 saves the ASP in memory 240 using connection 340 and also forwards the ASP to transceiver 230 using connection 320. Once the ASP is forwarded to transceiver 230 the controller 220 resets counter 260 on connection 350 to designate $T_{F0}$. The transceiver 230 will modulate the ASP onto a radio frequency (RF) carrier and send the resultant RF signal over connection 330 to antenna 250 for broadcast.

The broadcast RF signal will be received at each node. Referring to exemplary node 400-0, the RF signal is received on antenna 440 and is sent over connection 520 to transceiver 420. Transceiver 420 demodulates the RF signal to recover the ASP and then forwards the ASP to controller 410 using connection 500. The controller 410 will reset counter 450 on connection 530 once it detects receipt of the ASP to designate $T_{F0}$. Additionally, the controller 410 will determine which time slots are mapped to node 400-0 and store this information in memory 430 using connection 510. Node 400-0 then waits until counter 450 indicates the beginning of the allocated time slot before it initiates communications.

During a node's time slot the node can receive, send, or receive and send data. However, a node may decide not to send information in its assigned slot if no such information is available. Computer 100 usually generates, in a conventional manner, the data that is sent to the nodes. Data that originates in computer 100 is sent to the base station 200 using connection 300 and I/O interface 210. I/O interface 210 forwards the data from the computer to controller 220 using connection 310. Controller 220 then waits until the time slot for the node becomes available based on the ASP stored in memory 240 and when counter 260 indicates the beginning of the allocated time slot. Controller 220 sends the data to transceiver 230 using connection 320 when the time slot is available. Transceiver 230 will modulate the data onto an RF carrier and send the resultant RF signal over connection 330 to antenna 250 for broadcast. Each node will receive the broadcast signal, however only the node whose time slot is currently active will receive and use the data. The other nodes will ignore the transmission.

Data that is sent by the node is usually stored within the memory of the node until the node's time slot becomes available. Referring to node 400-0 of FIG. 1, controller 410 waits until counter 450 indicates the beginning of the time slot allocated to node 400-0 as designated by the ASP information that was previously stored in memory 430. Controller 410 will send the data stored in memory 430 over connection 500 to transceiver 420 when the node's time slot is available. Transceiver 420 will modulate the data onto an RF carrier and send the resultant RF signal over connection 520 to antenna 440 for broadcast.

An alternate embodiment allows the base station to broadcast to the nodes using an addressing scheme encoded in the broadcast, thus only the nodes with the same address as that in the transmission would receive the transmission. This means that in a full-duplex system the base station can send data to the nodes at any time during the data frame while the nodes are only allowed to send data during their respective time slots. This would increase the communications efficiency of the system.

The improved method for TDM using ASP enables the communications system to adjust the payload length of each data frame on a frame-by-frame basis thus enhancing the flexibility of the system. FIG. 3 shows an example of back-to-back data frames that take advantage of adjustable payload length. A first data frame, initiated by ASP 30, is followed by seven time slots TSO-1, TS1-1, TS2-1, TS3-1, TS4-1, TS5-1 and TS6-1. A second time frame, initiated by ASP 40, is followed by 6 time slots labeled TSO-2, TS1-2, TS2-2, TS3-2, TS4-2, and TS5-2. Additionally, four nodes labeled node A, node B, node C and node D are illustrated.

FIG. 3 shows how each data frame is mapped. ASP 30 maps the first data frame as follows: Node A to TSO-1; Node B to TS1-1 through TS3-1; Node C to TS4-1; Node D to TS5-1 and TS6-1. ASP 40 maps the second data frame as follows: Node A to TSO-2; Node B to TS1-2 and TS2-2; Node C to TS3-2 and TS4-2; Node D to TS5-2. The mapping for each node is different in the two frames, and the overall length of the data frame following ASP 30 is different than the length of the data frame following ASP 40. It is also possible to change the duration of each time slot from frame to frame by encoding an indicator within the ASP to define the time slot duration for that frame.

The example in FIG. 3 shows but one possible mapping order, however the improved method and apparatus is not limited to this mapping order and other mapping orders are possible such as mapping a node to multiple non-sequential time slots.

The flexibility of the improved method and apparatus enables nodes to be added or removed from the system on a frame-by-frame basis. A node can be added to the system by changing the ASP to map a time slot or multiple time slots for the new node. However the node needs to be 'registered' by the base station first before the node is recognized. There are many ways of registering a node such as using a polling cycle whereby the base station sends out a polling ASP that maps all the possible nodes to a time slot in the data frame (or splitting up the polling ASP amongst multiple data frames) and then waits for a response from each node. If there is a response then that node is active, and if there is no response then that node is considered inactive and will be ignored in future ASP mappings. Polling the nodes is just one method of registering nodes in a system; however, other methods of registering nodes are possible and known to one skilled in the art.

A node can be easily removed from the system if needed. A node can be removed from a future ASP mapping if it does not respond during its allocated time slot. Optionally, the system may instead wait for several missed time slots before assuming an inactive node. This approach prevents the system from removing a node that may be temporarily out of range or unable to communicate for some other reason.

The flexibility of the improved method and apparatus enables the nodes to operate in a low power mode except during their allocated time slot. Alternately the system could power down those nodes with no information to send. A node that is powered down will not communicate with the base station and in some embodiments, this could cause a powered down node to be dropped from future ASP mapping. Communications with such a node would resume when the node goes through a registration procedure with the base station as discussed above. Alternatively, the base station could leave all the nodes mapped in the ASP and just receive data from the nodes with data to send during their respective time slots.

It is noted that the connection 300 from base station 200 to computer 100 can be any conventional hardwired or wireless interface such as those know as USB, IEEE 1394, Ethernet.

It is also noted that the preferred embodiment of FIG. 1 is but one possible embodiment. Another embodiment would be to eliminate controller 220 in the base station 200 and to utilize computer 100 to take over the functions of the controller. Additionally, computer 100 could replace memory 240 as well. This would essentially make the base station 200 nothing more than a transceiver thus greatly reducing the cost of implementation. Other embodiments are possible as well and are within the inventive elements of the improved method and apparatus as they would be obvious to one skilled in the art.

The described method and apparatus can be used in a multitude of applications. The inventive principles of the present invention are useful for industrial, office, or any other type of multi-node application. Industrial applications may include multi-sensor alarm system monitoring, remote instrumentation monitoring, manufacturing flow and tracking, control of lighting, heating and cooling, etc. Office applications may include conference room interaction systems, employee/visitor tracking, asset control, etc.

The following is an example that shows how the invention can be used in an embodiment that includes a large number of low power devices that communicate using a wireless TDM communication channel. Such an application would, for example, be a student testing system consisting of a computer connected to a base station and a multitude of wireless "answer" devices, one for each student. The answer devices are normally kept in sleep mode in order to conserve power. Additionally, there is a projection system that the teacher uses to show the questions to the students. The students use the answer devices to record their answers to the questions shown on the projection system. The answer device then waits until it receives an ASP allocating a time slot for that device. The answer is then transmitted to the base station during the allocated time slot.

The foregoing description for an improved method and apparatus for a time division multiplexing protocol for wireless networks describes a specific embodiment; however, other embodiments are also possible that take advantage of the inventive principles. For example, another embodiment involves use of TDM and ASP in a wired system. Yet another embodiment uses TDM and ASP in an optical system.

It is noted that the embodiment shown the counters 450 and 260 operate as timers in a conventional manner. Counters 260 and 450 could be replaced by other types of conventional timers. In all embodiments, the timer is synchronized by the time of receipt of the ASP.

While the invention has been shown and described with respect to preferred embodiments thereof, it should be understood that a wide variety of other embodiments are possible without departing from the scope and sprit of the invention. The scope of the invention is only limited by the appended claims.

We claim:

1. In an educational system, a method for synchronizing time slots on a time division multiplex (TDM) communication channel between a base station and a plurality of student response devices, comprising:

creating, at said base station, a synchronization packet that includes information allocating one or more fixed length time slots in a data frame to each of said student response devices, whereby each student response device receives and communicates data using fixed length time slots;

sending said synchronization packet to said student response devices; and communicating between said base station and said student response devices to send and receive data during the fixed length time slots allocated to each student response device, the length of a communication frame being variable and depending upon the number of fixed length time slots assigned to said student response devices for data transmission and reception.

2. The method of claim 1, wherein the said communication channel comprises a wireless communication channel.

3. The method of claim 1, wherein the beginning of the time slot allocated to the student response device is relative to the time of receipt of the synchronization packet at the student response device.

4. The method of claim 1, wherein the number of time slots in a data frame varies from one synchronization packet to another.

5. The method of claim 1, wherein different numbers of time slots are allocated to different student response devices.

6. The method recited in claim 1 wherein said synchronization packet is an Asynchronous Synchronization Packet (ASP).

7. The method recited in claim 6 wherein said ASP designates the number of fixed length time slots that can be used by each student response device to transmit and receive data.

8. The method recited in claim 6 wherein each particular student response device determines from said ASP the number of fixed length time slots that can be used by said particular student response device to transmit and receive data.

9. The method recited in claim 6 wherein said student response devices determine from said ASP the number of time slots that can be used by said particular student response device to transmit and receive data.

10. The method recited in claim 1 wherein said TDM channel is divided into fixed length time slots.

11. An educational system comprising in combination:
   a central computer,
   a base station in communication with said central computer,
   a plurality of answering devices that communicate with said base station over a wireless Time Division Multiplex (TDM) channel,
   structure in said base station for transmitting an Asynchronous Synchronization Packet (ASP) from said base station to said answering devices, said ASP assigning a time slot to a particular answering device,
   structure in said answering devices for synchronizing said answering devices in accordance with the time of receipt of said ASP, and
   structure in said answering devices for transmitting a student response to said base station during an assigned time slot.

12. The system recited in claim 11 wherein said TDM channel is divided into fixed length time slots.

13. The system recited in claim 11 wherein said ASP designates the number of fixed length time slots that can be used by each student answering device to transmit and receive data.

14. The system recited in claim 11 wherein each particular student answering device determines from said ASP the number of fixed length time slots that can be used by said particular student answering device to transmit and receive data.

15. The system recited in claim 11 wherein said student answering devices determine from said ASP the number of time slots that can be used by said particular student answering device to transmit and receive data.

16. The system recited in claim 11 wherein said student answering devices determine from said ASP a particular time slot that can be used by said particular student answering device to transmit and receive data.

* * * * *